US011901541B2

(12) United States Patent
Kong et al.

(10) Patent No.: US 11,901,541 B2
(45) Date of Patent: Feb. 13, 2024

(54) ELECTRODE SHAPING APPARATUS HAVING NOTCHING PILOT PIN AND ELECTRODE SHAPING METHOD USING THE SAME

(71) Applicant: LG Energy Solution, Ltd., Seoul (KR)

(72) Inventors: Tae Yoon Kong, Daejeon (KR); Seung Hyun Lim, Daejeon (KR)

(73) Assignee: LG Energy Solution, Ltd.

( * ) Notice: Subject to any disclaimer, the term of this patent is extended or adjusted under 35 U.S.C. 154(b) by 0 days.

(21) Appl. No.: 18/013,114

(22) PCT Filed: Oct. 15, 2021

(86) PCT No.: PCT/KR2021/014395
§ 371 (c)(1),
(2) Date: Dec. 27, 2022

(87) PCT Pub. No.: WO2022/080966
PCT Pub. Date: Apr. 21, 2022

(65) Prior Publication Data
US 2023/0335702 A1    Oct. 19, 2023

(30) Foreign Application Priority Data

Oct. 16, 2020  (KR) ......................... 10-2020-0134693

(51) Int. Cl.
*H01M 4/04*  (2006.01)
(52) U.S. Cl.
CPC .................................. *H01M 4/043* (2013.01)

(58) Field of Classification Search
None
See application file for complete search history.

(56) References Cited

U.S. PATENT DOCUMENTS

2013/0252072 A1    9/2013  Min et al.

FOREIGN PATENT DOCUMENTS

| JP | 2011081964 A | 4/2011 |
|----|----|----|
| JP | 5159007 B2 | 3/2013 |
| KR | 100872498 B1 | 12/2008 |
| KR | 101326628 B1 | 11/2013 |
| KR | 101719026 B1 | 3/2017 |
| KR | 101737790 B1 | 5/2017 |
| KR | 101901777 B1 | 9/2018 |
| KR | 102026126 B1 | 9/2019 |
| KR | 20200112419 A | 10/2020 |

OTHER PUBLICATIONS

International Search Report for Application No. PCT/KR2021/014395 dated Jan. 24, 2022, 2 pages.

*Primary Examiner* — Tracy M Dove
(74) *Attorney, Agent, or Firm* — Lerner David LLP

(57) ABSTRACT

The present invention relates to an electrode shaping apparatus having a sheet transfer unit, a fixing unit, a punch unit including a center punching unit and a side punching unit, wherein the center punching unit includes a hole punching member and a notching pilot pin, the electrode shaping apparatus configured to reduce a step that may occur during notching of an electrode, and an electrode shaping method using the same.

10 Claims, 5 Drawing Sheets

【FIG. 1】
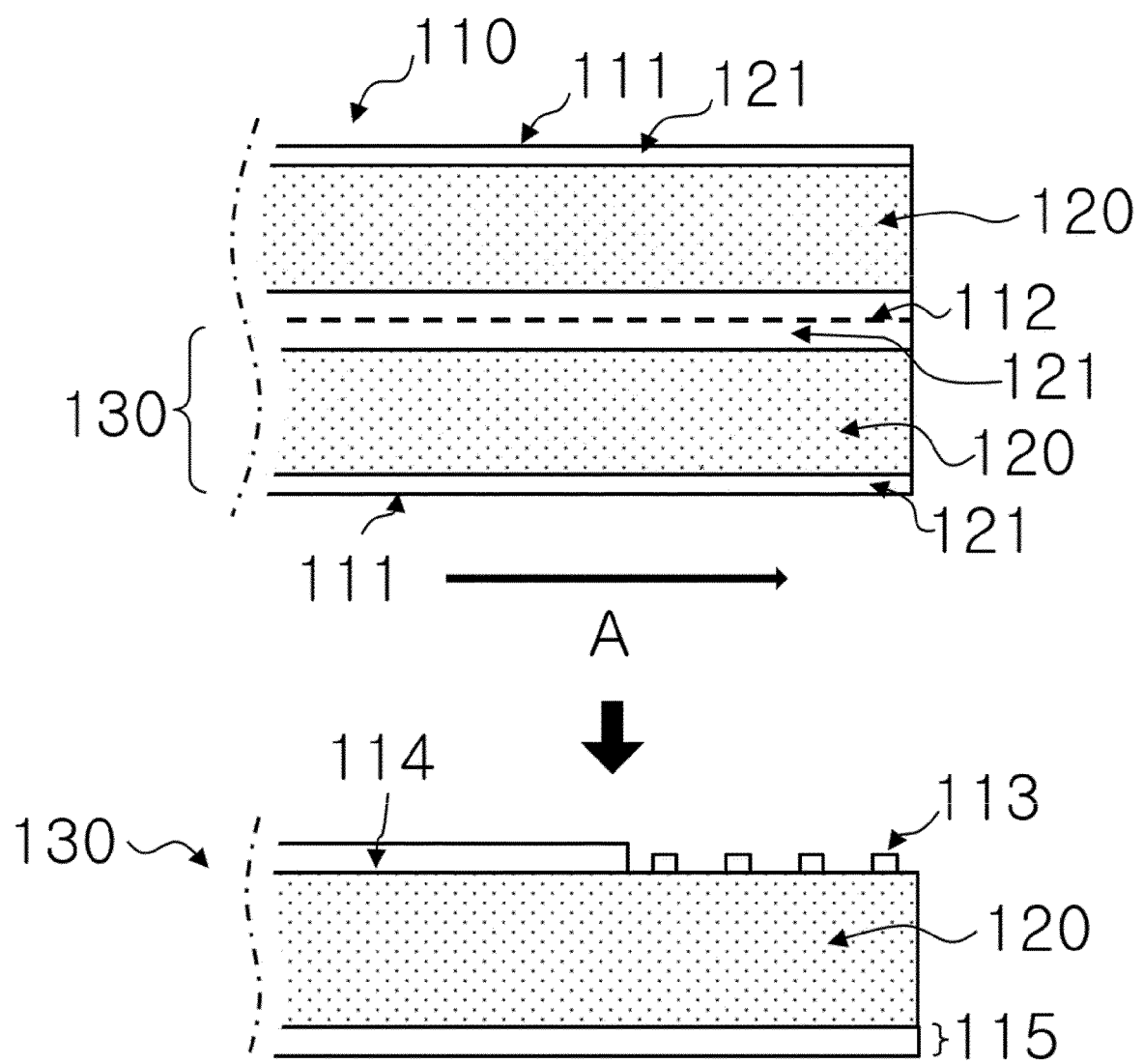

[FIG. 2]
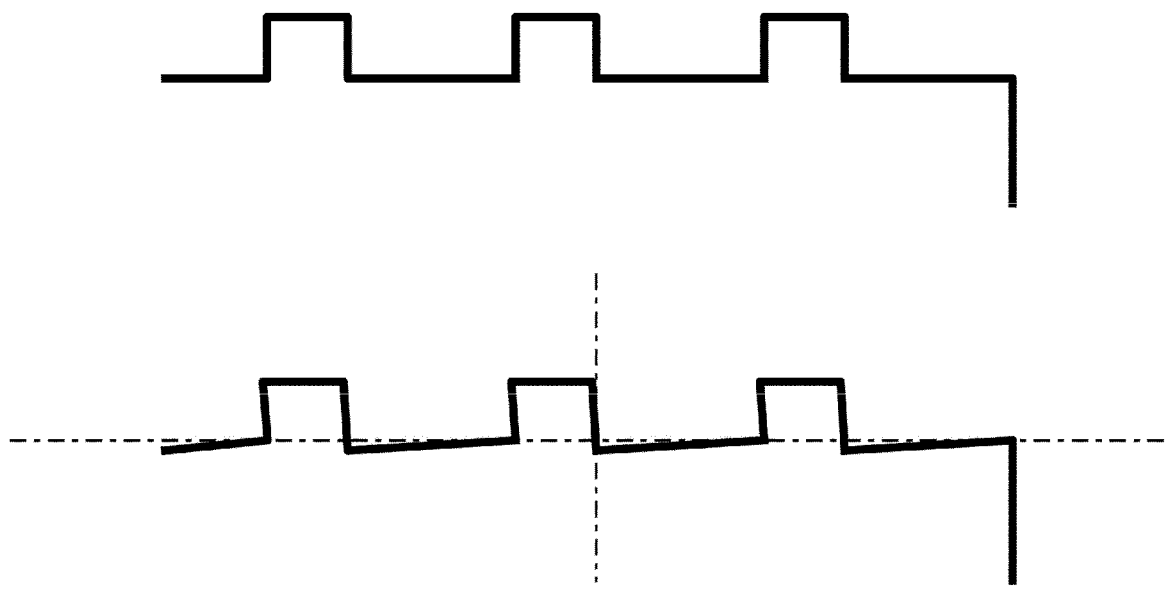

[FIG. 3]
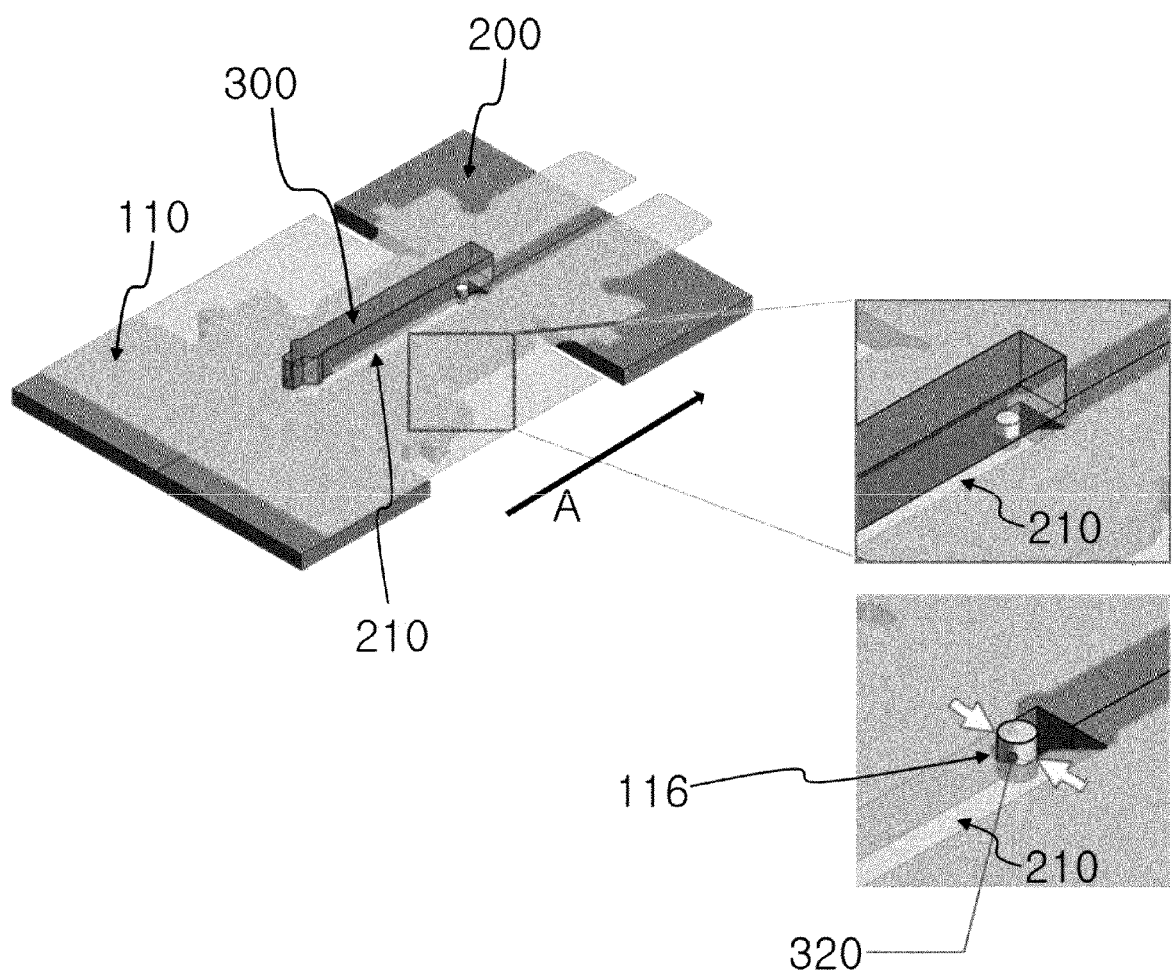

[FIG. 4]
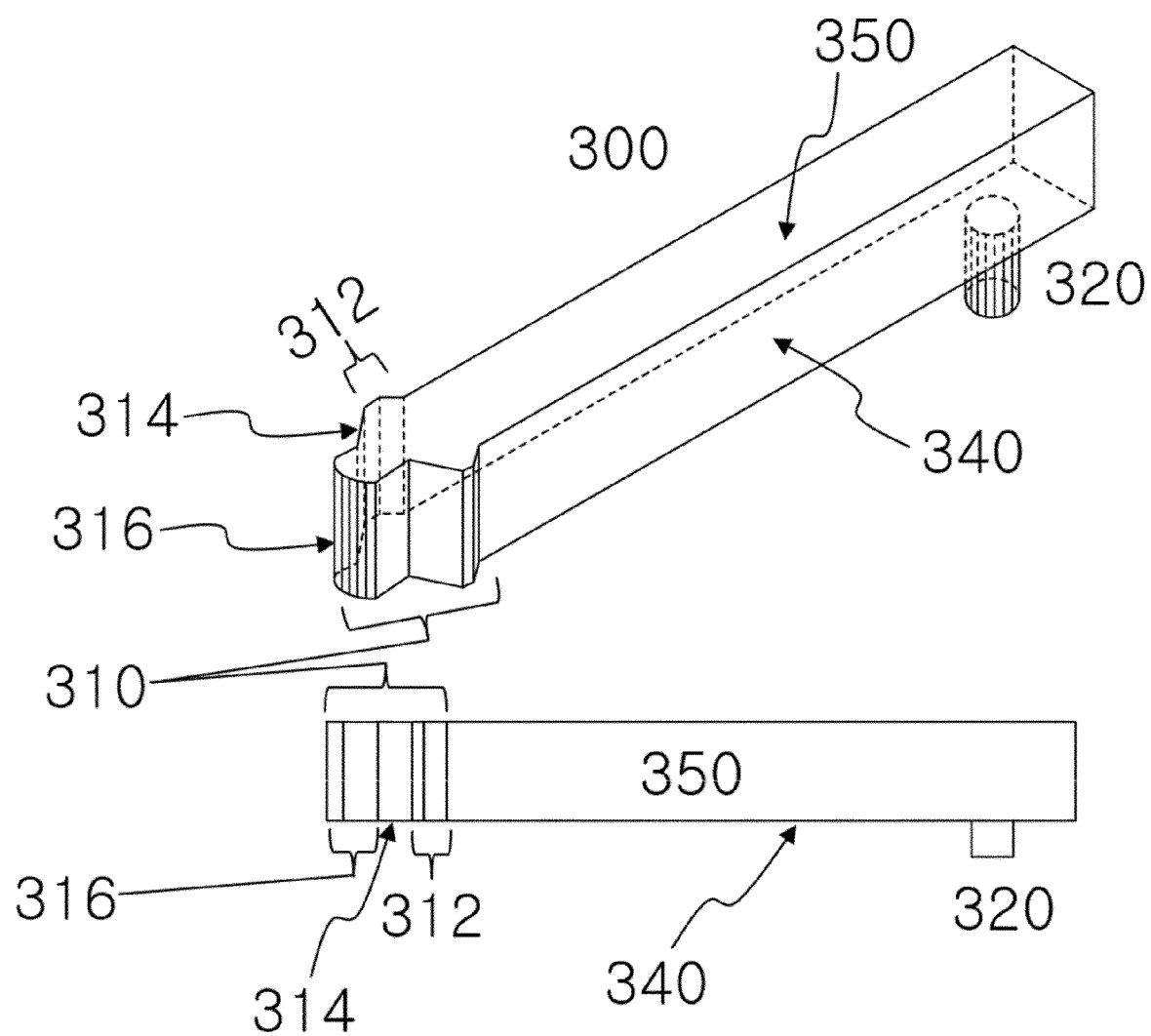

[FIG. 5]
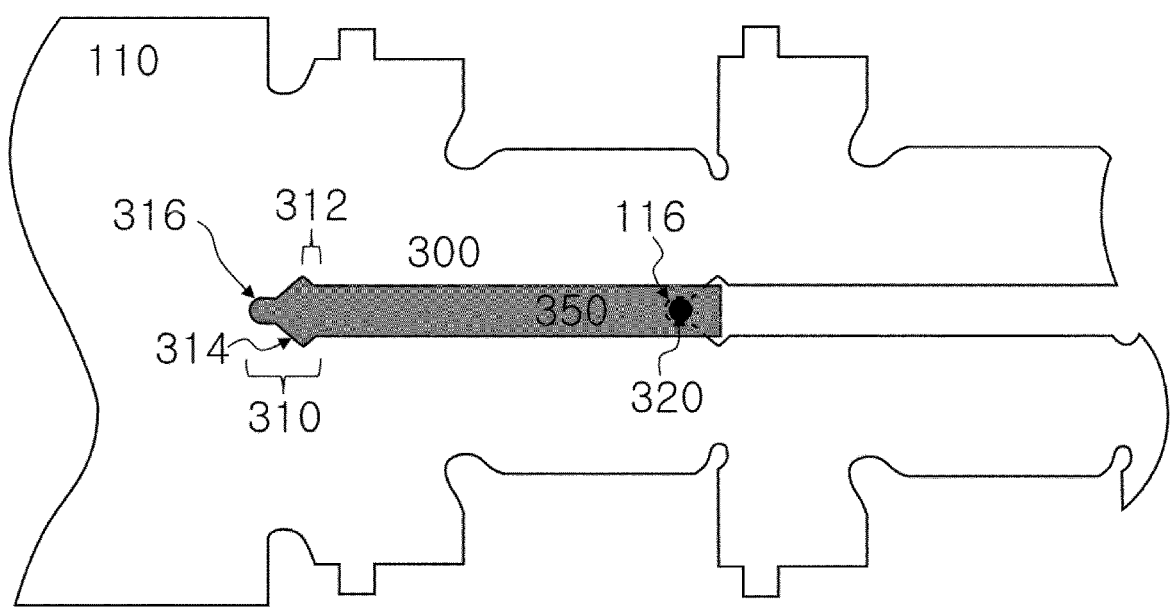

ELECTRODE SHAPING APPARATUS HAVING NOTCHING PILOT PIN AND ELECTRODE SHAPING METHOD USING THE SAME

CROSS-REFERENCE TO RELATED APPLICATIONS

This application is a national phase entry under 35 U.S.C. § 371 of International Application No. PCT/KR2021/014395, filed on Oct. 15, 2021, which claims the benefit of priority to Korean Patent Application No. 10-2020-0134693 filed on Oct. 16, 2020, the disclosure of which is incorporated herein by reference in its entirety.

TECHNICAL FIELD

The present invention relates to an electrode shaping apparatus having a notching pilot pin and an electrode shaping method using the same. More particularly, the present invention relates to an electrode shaping apparatus having a notching pilot pin configured to reduce a step that may occur during notching of an electrode and an electrode shaping method using the same.

BACKGROUND ART

A secondary battery is manufactured by mounting an electrode assembly in a cylindrical or prismatic case made of a metal material or a pouch case made of a laminate sheet including aluminum, injecting an electrolytic solution into the case, and hermetically sealing the case.

The electrode assembly, which has a structure in which a positive electrode and a negative electrode are stacked in the state in which a separator is interposed therebetween, is classified as (1) a jelly-roll type electrode assembly, which is configured to have a structure in which a long sheet type positive electrode having an active material applied thereto and a long sheet type negative electrode having an active material applied thereto are wound in the state in which a separator is interposed therebetween, (2) a stacked type electrode assembly which is configured to have a structure in which a flat positive electrode and a flat negative electrode are stacked in the state in which a separator is interposed therebetween, (3) a stacked and folded type electrode assembly, which is configured to have a structure in which unit cells are wound in a state of being disposed on a long sheet type separator, (4) or a laminated and stacked type electrode assembly, which is configured to have a structure in which unit cells are stacked in the state in which a separator is interposed therebetween.

In the stacked type electrode assembly, the stacked and folded type electrode assembly, or the laminated and stacked type electrode assembly, a single-sided electrode plate or a double-sided electrode plate configured such that an electrode active material is applied to one surface or opposite surfaces of a current collector is used.

In general, a method of manufacturing the electrode assembly includes a process of manufacturing an electrode sheet, a process of pressing the electrode sheet, a process of slitting the electrode sheet by a predetermined length so as to be suitable for the standards of a cell, a vacuum drying process, a process of notching an electrode tab on the electrode sheet, and a process of manufacturing an electrode assembly including the electrode sheet and a separator.

In connection therewith, FIG. 1 is a plan view showing a portion of a conventional electrode manufacturing process.

Referring to FIG. 1, an electrode material coating portion 120 is formed on only a portion of the electrode sheet 110 excluding opposite side outer peripheries 111 and a middle part of the electrode sheet in a transfer direction A, and an electrode material non-coating portion 121 is formed on the remaining portion of the electrode sheet excluding the electrode material coating portion 120.

The electrode sheet 110 is divided into two equal parts, i.e., two unit electrode sheets 130, along a slitting line 112 at the middle part of the electrode sheet 110 in the transfer direction A.

A first side outer periphery 114 of the unit electrode sheet 130 divided along the slitting line 112 in the transfer direction A is notched in order to form an electrode tab 113, and a second side outer periphery 115 of the unit electrode sheet is notched in order to form a portion to be cut for manufacture of a unit electrode. In FIG. 1, the electrode tab 113 may be simultaneously notched when the electrode sheet is divided into two equal parts along the slitting line 112.

In the specification of the present application, notching includes not only a process of cutting the electrode tab so as to fit the shape thereof but also cutting the electrode sheet into two equal parts along the slitting line. In addition, the electrode sheet and a sheet include a metal electrode sheet with or without an electrode material coating portion.

When the electrode is notched, theoretically, the electrode sheet must be cut so as to be parallel to the transfer direction of the electrode sheet and the electrode tab must be cut so as to be perpendicular thereto, as shown in the upper part of FIG. 2. In the electrode sheet 110, the electrode material coating portion 120 and the electrode material non-coating portion 121 are different in thickness from each other. When notching is performed, therefore, the electrode tab is not correctly cut but is cut (notched) in a retarded state, i.e., meandering defects occur (see the lower part of FIG. 2).

When a step is formed at the electrode tab due to meandering defects, 1) an upper layer and a lower layer are not accurately aligned with each other in a stacking process to manufacture the electrode assembly, whereby efficiency of a battery is reduced, 2) a protruding portion of the electrode tab damages a separator, whereby short circuiting may occur, and 3) when each electrode is rotated during manufacture of the electrode assembly, a criterion based on which the position of the electrodes is accurately controlled and the electrodes are stacked becomes ambiguous.

Japanese Registered Patent Publication No. 5159007 ("the '007 patent") discloses a method of manufacturing an electrode plate for batteries that continuously forms a plurality of electrode plates from a belt type or hoop type electrode plate by punching using a punching press constituted by an upper press and a lower press capable of moving upwards and downwards, wherein the upper press has a punch and a shear blade mounted in the front thereof in a cutting direction, the lower press has a die having a punch hole, into which the punch is inserted, and a shear blade mounted in the front thereof in the cutting direction, when punching is performed in the state in which opposite sides of electrode plates are adjacent to each other as a common side in a longitudinal direction of the electrode plate, on the assumption that one of the opposite sides in a direction in which the electrode plates are adjacent to each other is opposite side A and the common side is side B, a corner formed by side A and side B is chamfered, and the lower press is configured such that a stepped upper part having two or more steps having a hole size increased stepwise in the punching direction is formed in the lower part of the punch hole.

The '007 patent does not disclose the construction of the notching pilot pin according to the present invention, and does not suggest a solution to the problem to be solved by the present invention, since this document relates to preventing clogging due to cut scraps of the electrode plate and increasing the lifespan of the notching punch.

Korean Registered Patent Publication No. 1326628 ("the '628 patent") discloses a notching apparatus for notching a continuous electrode sheet having an electrode active material applied to one surface or opposite surfaces thereof at unit electrode intervals in order to manufacture a plurality of unit electrodes from the electrode sheet, the notching apparatus including a press configured to notch the upper end and the lower end of the electrode sheet in the state in which the position of the press is fixed and two or more grippers located at the rear of the press in a direction in which the electrode sheet is supplied, the grippers being configured to hold and transfer the electrode sheet by one pitch, which is a size corresponding to a unit electrode, in response to the operation of the press, wherein, when one of the grippers holds and transfers the electrode sheet, the other grippers moves to positions for holding.

The '628 patent is characterized in that notches are formed in the electrode sheet, and the electrode sheet is supplied by one pitch by the first and second grippers and is then punched, whereby notching is performed at predetermined intervals, which, however, is not a solution to meandering defects.

Korean Registered Patent Publication No. 2026126 ("the '126 patent") discloses an electrode manufacturing apparatus including a notching roller, the electrode manufacturing apparatus including a transfer unit configured to continuously transfer a first electrode sheet having an electrode active material applied to a long sheet type current collector in order to notch and cut the first electrode sheet, a notching roller having a cylindrical structure, the notching roller being configured to notch one surface of the first electrode sheet by rotation in order to manufacture a second electrode sheet having one side outer periphery and the other side outer periphery continuously formed, and a cutter configured to cut the notched second electrode sheet to a length corresponding to the width of the electrode in order to manufacture a final electrode, wherein the notching roller includes a first notching portion configured to form one side outer periphery of the second electrode sheet and a second notching portion configured to form the other side outer periphery of the second electrode sheet when viewed in plan.

In the '126 patent, it is described that the notching roller is used, whereby no notching step occurs. In the case in which the roller type roller is used, however, deviation in thickness between an electrode material coating portion and an electrode material non-coating portion is continuously accumulated, whereby meandering defects may be increased, and the '126 patent does not recognize such a problem.

Korean Registered Patent Publication No. 1737790 ("the '790 patent") relates to a press apparatus configured to form a plurality of electrode plates of a lithium ion polymer battery used in a hybrid electric vehicle at once, wherein an upper press having a cutting means and a lower press configured to assist the upper press are installed, a thin flat electrode plate material is continuously supplied therebetween to simultaneously form a plurality of electrode plate members provided in a battery, whereby it is possible to accurately, uniformly, and continuously manufacture a plurality of electrode plates at once.

In the '790 patent, a notching portion is formed on a middle cutter blade such that punching is performed while the boundary between the electrode plate members is marked; however, this document does not recognize a problem of meandering defects.

In a process of manufacturing electrodes in large quantities through notching, as described above, a problem of a step being formed due to meandering defects has a continuous influence on manufacture of an electrode assembly, which is a subsequent process, and the performance of a battery based thereon. However, such a problem is still not recognized, and a clear solution to such a problem has not been suggested yet.

DISCLOSURE

Technical Problem

The present invention has been made in view of the above problems, and it is an object of the present invention to provide an electrode shaping apparatus capable of solving a problem of a step being formed at an electrode tab that may occur during notching and an electrode shaping method using the same.

Technical Solution

In order to accomplish the above object, the present invention provides an electrode shaping apparatus including a sheet transfer unit configured to move an electrode sheet at a predetermined speed; a fixing unit configured to fix the electrode sheet; and a punch unit constituted by a center punching unit and a side punching unit configured respectively to remove a central part of the electrode sheet and a portion of an outer periphery of the electrode sheet by notching, wherein the center punching unit includes a hole punching member and a notching pilot pin.

The center punching unit may include a rectangular parallelepiped main body having a major axis in a movement direction of the electrode sheet; the hole punching member, the hole punching member being formed at a rear end of the main body in the movement direction of the electrode sheet; and the notching pilot pin, the notching pilot pin being formed under a front end of the main body in the movement direction of the electrode sheet.

The main body may be formed in a rectangular parallelepiped shape having a major axis in the movement direction of the electrode sheet, and may include a main body punching surface configured to punch the electrode sheet as the lower surface of the rectangular parallelepiped.

The hole punching member may include an enlarged portion extending from the rear end of the main body in the movement direction of the electrode sheet, the width of the punching surface configured to punch the electrode sheet being increased at the enlarged portion; a reduced portion extending from the enlarged portion, the width of the punching surface configured to punch the electrode sheet being decreased at the reduced portion along the major axis; and a pin punching portion extending from the reduced portion, the pin punching portion being configured to punch a catching recess, in which the notching pilot pin is caught, in the electrode sheet.

The section of the notching pilot pin may be any one of a circle, an arc, a wedge, a triangle, and a quadrangle.

The fixing unit may be provided in the middle thereof with a middle groove corresponding in shape to the center punching unit.

The middle groove may be formed so as to have a sufficient depth for the notching pilot pin to be inserted thereinto.

In addition, the present invention provides an electrode shaping method using the electrode shaping apparatus, the electrode shaping method including S1) transferring an electrode sheet by a predetermined length using the sheet transfer unit; S2) transferring the electrode sheet or the punch unit such that the notching pilot pin is caught in a recess formed in the electrode sheet in a previous step of punching such that the notching pilot pin is caught in the recess; S3) pressing the electrode sheet using the punch unit to punch the electrode sheet; and S4) spacing the punch unit apart from the electrode sheet.

In step S4), a distance by which the punch unit is spaced apart from the electrode sheet may be equal to or less than a distance by which at least a portion of the notching pilot pin remains inserted in the recess of the electrode sheet.

In addition, the present invention provides an electrode shaped using the electrode shaping apparatus.

Advantageous Effects

As is apparent from the above description, an electrode shaping apparatus having a notching pilot pin according to the present invention and an electrode shaping method using the same have an effect in that it is possible to solve a problem, which may occur during notching, of a step being formed at an electrode tab, compared to a conventional electrode shaping apparatus.

The present invention has an effect in that it is possible to remove meandering defects that may occur in the conventional electrode shaping apparatus, whereby 1) an upper layer and a lower layer are accurately aligned with each other in a stacking process to manufacture the electrode assembly, whereby efficiency of a battery is increased, 2) there is no protruding portion of the electrode tab, whereby damage to a separator and occurrence of a short circuit are prevented, and 3) when each electrode is rotated during manufacture of the electrode assembly, a criterion based on which the position of the electrodes is accurately controlled and the electrodes are stacked becomes clear.

DESCRIPTION OF DRAWINGS

FIG. 1 is a plan view showing a portion of a conventional electrode manufacturing process.

FIG. 2 is a schematic view showing meandering defects of notching in the conventional electrode manufacturing process.

FIG. 3 is a perspective view of an electrode shaping apparatus according to an embodiment of the present invention.

FIG. 4 is a perspective view and a sectional view of a center punching unit according to an embodiment of the present invention.

FIG. 5 is a schematic view showing a coupling relationship between a notching pilot pin and a catching recess according to an embodiment of the present invention.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the entire specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Hereinafter, preferred embodiments of the present invention will be described in detail with reference to the accompanying drawings.

FIG. 3 is a perspective view of an electrode shaping apparatus according to an embodiment of the present invention, FIG. 4 is a perspective view and a sectional view of a center punching unit according to an embodiment of the present invention, FIG. 5 is a schematic view showing a coupling relationship between a notching pilot pin and a catching recess according to an embodiment of the present invention.

Referring to FIGS. 3 to 5, the electrode shaping apparatus according to the present invention includes a sheet transfer unit (not shown) configured to move an electrode sheet 110 at a predetermined speed; a fixing unit 200 configured to fix the electrode sheet 110; and a punch unit constituted by a center punching unit 300 and a side punching unit (not shown) configured respectively to remove a central part of the electrode sheet and a portion of the outer periphery of the electrode sheet by notching, wherein the center punching unit 300 includes a hole punching member 310 and a notching pilot pin 320.

The side punching unit is configured to perform notching into a special shape, as shown in FIG. 3, or to perform notching into a common electrode tab shape, as shown in FIG. 2. However, the present invention is not limited thereto.

The center punching unit 300 may include a rectangular parallelepiped main body 350 having a major axis in a movement direction A of the electrode sheet 110, the hole punching member 310 formed at the rear end of the main body 350 in the movement direction A of the electrode sheet 110, and the notching pilot pin 320 formed under the front end of the main body 350 in the movement direction A of the electrode sheet 110.

The main body 350 may be formed in a rectangular parallelepiped shape having a major axis in the movement direction A of the electrode sheet 110, and may include a main body punching surface 340 configured to punch the electrode sheet as the lower surface of the rectangular parallelepiped.

The hole punching member 310 may include an enlarged portion 312 extending from the rear end of the main body 350 in the movement direction A of the electrode sheet 110, the width of the punching surface configured to punch the electrode sheet being increased at the enlarged portion; a reduced portion 314 extending from the enlarged portion 312, the width of the punching surface configured to punch the electrode sheet 110 being decreased at the reduced portion along the major axis A; and a pin punching portion 316 extending from the reduced portion 314, the pin punching portion 316 being configured to punch a catching recess 116, in which the notching pilot pin 320 is caught, in the electrode sheet 110. The catching recess 116 is formed in the electrode sheet 110 as indicated by a dotted line in FIG. 5, and is formed in the electrode sheet 110 as indicated by a blue color in FIG. 3.

The section of the notching pilot pin 320 may be any one of a circle, an arc, a wedge, a triangle, and a quadrangle, although the notching pilot pin is formed in a cylindrical shape as shown in FIGS. 3 to 5. In particular, the wedge type or triangular notching pilot pin may be connected to the reduced portion 314 in order not only to perform alignment in the transfer direction A of the electrode sheet 110 but also to perform alignment in a direction perpendicular to the transfer direction A.

The fixing unit 200 may be provided in the middle thereof with a middle groove 210 corresponding in shape to the center punching unit. The middle groove 210 may be formed so as to have a sufficient depth for the notching pilot pin 320 to be inserted thereinto.

In addition, the present invention provides an electrode shaping method using the electrode shaping apparatus, the electrode shaping method including S1) a step of transferring an electrode sheet by a predetermined length using the sheet transfer unit; S2) a step of transferring the electrode sheet or the punch unit such that the notching pilot pin is caught in a recess formed in the electrode sheet in a previous step of punching such that the notching pilot pin is caught in the recess; S3) a step of pressing the electrode sheet using the punch unit to punch the electrode sheet; and S4) a step of spacing the punch unit apart from the electrode sheet.

In step S4), the distance by which the punch unit is spaced apart from the electrode sheet is equal to or less than the distance by which at least a portion of the notching pilot pin remains inserted in the recess of the electrode sheet.

As described above, the electrode shaping apparatus having the notching pilot pin according to the present invention and the electrode shaping method using the same have an effect in that it is possible to solve a problem of a step being formed at an electrode tab that may occur during notching, compared to a conventional electrode shaping apparatus.

Those skilled in the art to which the present invention pertains will appreciate that various applications and modifications are possible within the category of the present invention based on the above description.

DESCRIPTION OF REFERENCE SYMBOLS

110: Electrode sheet
111: Outer periphery
112: Slitting line
113: Electrode tab
114: First outer periphery
115: Second outer periphery
116: Catching recess
121: Electrode material non-coating portion
120: Electrode material coating portion
130: Unit electrode sheet
200: Fixing unit
210: Middle groove
300: Center punching unit
310: Hole punching member
312: Enlarged portion
314: Reduced portion
316: Pin punching portion
320: Notching pilot pin
340: Main body punching surface
350: Main body
A: Transfer direction

INDUSTRIAL APPLICABILITY

The present invention relates to an electrode shaping apparatus having a notching pilot pin configured to reduce a step that may occur during notching of an electrode and an electrode shaping method using the same, and therefore the present invention has industrial applicability.

The invention claimed is:

1. An electrode shaping apparatus comprising:
a sheet transfer unit configured to move an electrode sheet at a predetermined speed;
a fixing unit configured to fix the electrode sheet; and
a punch unit including:
a center punching unit configured to remove a central part of the electrode sheet; and
a side punching unit configured to remove a portion of an outer periphery of the electrode sheet by notching,
wherein the center punching unit comprises a hole punching member and a notching pilot pin.

2. The electrode shaping apparatus according to claim 1, wherein the center punching unit comprises:
a rectangular parallelepiped main body having a major axis in a movement direction of the electrode sheet;
the hole punching member formed at a first end of the main body in the movement direction of the electrode sheet; and
the notching pilot pin formed under a second end of the main body opposite the first end in the movement direction of the electrode sheet.

3. The electrode shaping apparatus according to claim 2, wherein the main body is formed in a rectangular parallelepiped shape having the major axis in the movement direction of the electrode sheet, and includes a main body punching surface configured to punch the electrode sheet.

4. The electrode shaping apparatus according to claim 2, wherein the hole punching member comprises:
an enlarged portion extending from the first end of the main body in the movement direction of the electrode sheet, a width of a punching surface being increased at the enlarged portion and configured to punch the electrode sheet;
a reduced portion extending from the enlarged portion, the width of the punching surface being decreased at the reduced portion along the major axis and configured to punch the electrode sheet; and
a pin punching portion extending from the reduced portion, the pin punching portion configured to punch a catching recess, in which the notching pilot pin is configured to be caught, in the electrode sheet.

5. The electrode shaping apparatus according to claim 2, wherein a section of the notching pilot pin is any one of a circle, an arc, a wedge, a triangle, and a quadrangle.

6. The electrode shaping apparatus according to claim 1, wherein the fixing unit includes a middle groove corresponding in shape to the center punching unit.

7. The electrode shaping apparatus according to claim 6, wherein the middle groove has a sufficient depth for the notching pilot pin to be inserted into the middle groove.

8. An electrode shaping method using the electrode shaping apparatus according to claim 1, the electrode shaping method comprising:
- S1) transferring the electrode sheet by a predetermined length using the sheet transfer unit;
- S2) transferring the electrode sheet or the punch unit such that the notching pilot pin is caught in a recess formed in the electrode sheet in a previous step of punching such that the notching pilot pin is caught in the recess;
- S3) pressing the electrode sheet using the punch unit to punch the electrode sheet; and
- S4) spacing the punch unit apart from the electrode sheet.

9. The electrode shaping method according to claim 8, wherein, in step S4), a distance by which the punch unit is spaced apart from the electrode sheet is equal to or less than a distance by which at least a portion of the notching pilot pin remains inserted in the recess of the electrode sheet.

10. An electrode shaped using the electrode shaping apparatus according to claim 1.

* * * * *